United States Patent [19]

Stockl et al.

[11] Patent Number: 5,274,025
[45] Date of Patent: Dec. 28, 1993

[54] INK AND COATING COMPOSITIONS CONTAINING A BLEND OF WATER-DISPERSIBLE POLYESTER AND HYDANTOIN-FORMALDEHYDE RESINS

[75] Inventors: Rebecca R. Stockl; Hieu D. Phan; Gary T. Clark, all of Kingsport, Tenn.

[73] Assignee: Eastman Kodak Company, Rochester, N.Y.

[21] Appl. No.: 19,711

[22] Filed: Feb. 19, 1993

[51] Int. Cl.⁵ ................. C08L 67/00; C08L 77/00
[52] U.S. Cl. ................................. 524/513; 524/514; 525/437; 525/441; 525/443; 525/448; 525/450; 528/272; 528/290; 528/291; 528/292; 528/293; 528/302; 528/305; 528/307
[58] Field of Search ............... 524/513, 514; 525/437, 525/441, 443, 448, 450; 528/272, 293, 291, 292, 290, 302, 305, 307

[56] References Cited

U.S. PATENT DOCUMENTS

| | | | |
|---|---|---|---|
| 2,155,863 | 4/1939 | Jacobson | 260/69 |
| 2,532,278 | 12/1950 | Chadwick | 260/67.5 |
| 2,925,404 | 2/1960 | Caldwell et al. | 528/290 |
| 3,546,008 | 12/1970 | Shields et al. | 117/138.8 |
| 3,607,813 | 9/1971 | Purcell et al. | 260/29 A |
| 3,734,874 | 5/1973 | Kibler et al. | 260/29.2 |
| 3,779,993 | 12/1973 | Kibler et al. | 260/75 S |
| 4,148,779 | 4/1979 | Blackwell et al. | 260/40 R |
| 4,233,196 | 11/1980 | Sublett | 260/29.2 |
| 4,304,901 | 12/1981 | O'Neill et al. | 528/290 |
| 4,340,519 | 7/1982 | Kotera et al. | 523/414 |
| 4,704,309 | 11/1987 | Coney et al. | 427/258 |
| 4,738,785 | 4/1988 | Langston et al. | 210/738 |
| 4,996,252 | 2/1991 | Phan et al. | 524/88 |
| 5,039,339 | 8/1991 | Phan et al. | 428/481 |

Primary Examiner—Paul R. Michl
Assistant Examiner—LaVonda R. DeWitt
Attorney, Agent, or Firm—Betty J. James; William P. Heath, Jr.

[57] ABSTRACT

This invention relates to a polymer blend comprising water-dissipatable, sulfonate containing, a hydantoin-formaldehyde resin.

57 Claims, No Drawings

INK AND COATING COMPOSITIONS CONTAINING A BLEND OF WATER-DISPERSIBLE POLYESTER AND HYDANTOIN-FORMALDEHYDE RESINS

CROSS-REFERENCE IN RELATED APPLICATIONS

This application is related to U.S. Ser. No. 07/563,373 filed Aug. 6, 1990; U.S. Ser. No. 07/909,375 filed Jul. 6, 1992; and U.S. Pat. Nos. 4,996,252 and 5,039,339.

FIELD OF THE INVENTION

The field of the invention relates to blends of water dispersible polyesters or polyamides and hydantoin-formaldehyde resins and their use in ink and coating compositions.

BACKGROUND OF THE INVENTION

Inks containing a water-dissipatable polyester or polyesteramide are well known in the art (see, for example, U.S. Pat. Nos. 4,704,309, 4,738,785 and 4,340,519). Inks containing such a polymeric material have many desirable properties such as good adhesion to a variety of substrates and a wide viscosity range. However, despite the advantages obtained using such a polymeric material in aqueous inks, it is highly desirable to have another material which when added imparts viscosity stability and imparts brilliancy, high gloss, and high transparency to the dried ink film.

SUMMARY OF THE INVENTION

It has now been discovered that the water-dissipatable polyester material as described herein, when blended with a hydantoin-formaldehyde resin, will provide to ink compositions high gloss and high transparency without concomitant substantial sacrifice of the advantages obtained by use of the water-dissipatable polyester material alone. This polymer blend can be used to prepare water-based inks, ink overprints and ink primers, which shall be referred to herein collectively as "ink compositions." The ink compositions may be in dry form (dry ink compositions) or in wet form (aqueous ink compositions). More specifically, the present invention is directed to a polymer blend comprising:

(a) a polyester, component (A), consisting essentially of repeat units from a linear water-dissipatable polymer having carbonyloxy linking groups in the linear molecular structure wherein up to 80% of the linking groups may be carbonylamido linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer containing substantially equimolar proportions of acid equivalents (100 mole %) to hydroxy and amino equivalents (100 mole %), the polymer comprising the reaction products of reactants selected from the following components (1), (2), (3), and (4), or the ester forming or esteramide forming derivatives thereof, as follows, wherein all stated mole percentages are based on the total of all acid, hydroxyl and amino equivalents being equal to 200 mole %:

(1) at least one difunctional dicarboxylic acid;
(2) from about 2 to about 25 mole % of at least one difunctional sulfomonomer containing at least one metallic sulfonate group or nitrogen-containing non-metallic sulfonate group attached to an aromatic or cycloaliphatic nucleus wherein the functional groups are hydroxy, carboxyl or amino;
(3) at least one difunctional reactant selected from a glycol or a mixture of a glycol and diamine having two NRH groups, the glycol containing two —C(R)$_2$-OH groups, and
(4) from none to about 40 mole % of difunctional reactant selected from hydroxycarboxylic acids having one —C(R)$_2$—OH group, aminocarboxylic acids having one —NRH group, and aminoalcohols having one —C(R)$_2$—OH group and one —NRH group, or mixtures of said difunctional reactants;
wherein each R in the (3) and (4) reactants is a hydrogen atom or an alkyl group of 1 to 4 carbons; and (B) a hydantoin-formaldehyde resin, component (B).

Advantages of this invention for inks and coatings include: (1) lower viscosity at higher solids of inks and clear resins, (2) viscosity stability and shade and fluorescence stability for fluorescent inks, (3) good wetting of low surface energy substrates, (4) good adhesion to low surface energy substrates, (5) more transparent and visually pleasant color, (6) good printability and lay at low viscosity, (7) excellent flexographic ink or coating transfer, (8) slower drying rates, particularly on flexographic press, and (9) excellent rewettability on gravure and flexographic presses.

DETAILED DESCRIPTION OF THE PREFERRED EMBODIMENTS

As used herein, the term "water-dissipatable polyester", "water-dissipatable polyester material", "polyester material", or "polyester" refers to component (A) described hereinabove, "hydantoin-formaldehyde resin" refers to component (B) described hereinabove, "acrylic polymer" refers to component (C) described hereinbelow, "styrene/hydroxyethyl acrylate or styrene/hydroxyethyl methacrylate copolymer" refers to component (D) described herein, and "styrene copolymer" refers to component (E) described hereinbelow. "Polymer blend" refers to a blend of component (A) and component (B), and, optionally, components (C), (D) or (E).

Whenever the term "water-dissipatable" or "water-dispersible" is used in this description, it will be understood to refer to the activity of a water or aqueous solution on the polymer. The term is specifically intended to cover those situations wherein the solution dissolves and/or disperses the polyester material therein and/or therethrough.

The invention provides a polymer blend comprising:

(a) a polyester, component (A), consisting essentially of repeat units from a linear water-dissipatible polymer having carbonyloxy linking groups in the linear molecular structure wherein up to 80% of the linking groups are carbonylamido linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer containing substantially equimolar proportions of acid equivalents (100 mole %) to hydroxy and amino equivalents (100 mole %), the polymer comprising the reaction products of reactants selected from the following components (1), (2), (3), and (4), or the ester forming or esteramide forming derivatives thereof, as follows, wherein all stated mole percentages are based on the total of all acid, hydroxyl and amino equivalents being equal to 200 mole %:

(1) at least one difunctional dicarboxylic acid;
(2) from about 2 to about 25 mole % of at least one difunctional sulfomonomer containing at least one metallic sulfonate group or nitrogen-contained non-metallic sulfonate group attached to an aromatic or cycloaliphatic nucleus wherein the functional groups are hydroxy, carboxyl or amino;
(3) at least one difunctional reactant selected from a glycol or a mixture of a glycol and diamine having two —NRH groups, the glycol containing two —C(R)$_2$—OH groups, and
(4) from none to about 40 mole % of difunctional reactant selected from hydroxycarboxylic acids having one —C(R)$_2$—OH group, aminocarboxylic acids having one —NRH group, and amino-alcohols having one —C(R)$_2$—OH group and one —NRH group, or mixtures of said difunctional reactants;
wherein each R in the (3) and (4) reactants is a hydrogen atom or an alkyl group of 1 to 4 carbons; and
(B) a hydantoin-formaldehyde resin, component (B).

In the preferred form of the present invention, the polyester contains repeating units of a poly(ethylene glycol) of the formula H—(OCH$_2$—CH)$_n$—OH wherein n is an integer of 2 to 500. The value of n is preferably from between about 2 to about 20. The values of n and the mole percent of poly(ethylene glycol) in the polyester, if used, are adjusted such that the mole percent of poly(ethylene glycol) within the stated range is inversely proportional to the quantity of n within the stated ranges. Thus, when the mole percent is high, the value of n is low. On the other hand, if the mole percent is low, the value of n is high. It is apparent, therefore, that the weight percent (product of mole percent and molecular weight) of the poly(ethylene glycol) is an important consideration because the water dissipatability of the copolyester decreases as the weight percent poly(ethylene glycol) in the copolyester decreases. For example, if the weight of poly(ethylene glycol) is too low, the water-dissipatability of the copolyester may be inadequate. Furthermore, the weight percent of poly(ethylene glycol) is preferably adjusted such that it is inversely proportional to the mole percent of the difunctional sulfomonomer because the water-dissipatability of the copolyester is a function of both the mole percent sulfomonomer and the weight percent polyethylene glycol.

Examples of suitable poly(ethylene glycols) include relatively high molecular weight polyethylene glycols, some of which are available commercially under the designation "Carbowax", a product of Union Carbide. Diethylene glycol is also especially suitable.

Other useful glycols for preparing copolyester may consist of aliphatic, alicyclic and arylalkyl glycols. Examples of these glycols include ethylene glycol; propylene glycol; 1,3-propanediol; 2,4-dimethyl-2-ethylhexane 1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol, 1,5-pentanediol, 1,6-hexanediol, 2,2,4-trimethyl-1,6-hexanediol; thiodiethanol. 1,2-cyclohexanedimethanol, 1,3-cyclohexandimethanol; 1,4-cyclohexanedimethanol; 2,2,4,4-tetramethyl 1,3-cyclobutanediol; and p-xylylenediol.

The dicarboxylic acid component of the polyester are selected from aliphatic dicarboxylic acids, alicyclic dicarboxylic acids, aromatic dicarboxylic acids, or mixtures of two or more of these acids. Examples of such dicarboxylic acids, include succinic; glutaric; adipic; azelaic; sebacic; 1,4-cyclohexanedicarboxylic; phthalic; terephthalic; naphthalenedicarboxylic; and isophthalic acid. Terephthalic acid and isophthalic acid are preferred as the carboxylic acid component of the polyester. Cyclohexanedicarboxylic acid is also preferred.

It should be understood that use of the corresponding acid anhydrides, esters, and acid chlorides of these acids is included in the term "dicarboxylic acid." Other suitable acids are disclosed in U.S. Pat. No. 3,779,993.

The difunctional sulfomonomer component of the polyester may advantageously be a dicarboxylic acid or an ester thereof containing a metal sulfonate group, a glycol containing a metal sulfonate group or a hydroxy acid containing a metal sulfonate group. The metal ion of the sulfonate salt may be a monovalent metal such as Na+, Li+, K+ and the like.

Advantageous difunctional sulfomonomer components are those wherein the sulfonate salt group is attached to an aromatic nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters, or metallosulfoaryl sulfonate as described in U.S. Pat. No. 3,779,993.

Particularly superior results are achieved when the difunctional sulfomonomer component is 5-sodiosulfoisophthalic acid or its esters, and the glycol is a mixture of ethylene glycol or 1,4-cyclohexanedimethanol with diethylene glycol.

The nonmetallic portion of the nonmetallic sulfonate group is a nitrogen based cation derived from nitrogen-containing bases which may be aliphatic, cycloaliphatic or aromatic basic compounds that have ionization constants in water at 25° C. of $10^{-3}$ to $10^{-10}$, preferably $10^{-5}$ to $10^{-8}$. Especially preferred nitrogen containing bases are ammonia, dimethylethanolamine, diethanolamine, triethanolamine, pyridine, morpholine, and piperidine. Such nitrogen-containing bases and cations derived therefrom are described in U.S. Pat. No. 4,304,901, incorporated herein by reference.

When the sulfonate-containing difunctional monomer is an acid or its ester, the polyester or polyesteramide should contain at least 4 mole % of said monomer based on total acid content, with more than 8 mole % given particularly advantageous results.

In the water-dissipatable polymer it is preferred that very minor, e.g., less than about 10 mol percent based on all reactants, of reactant (4) is employed, that at least about 70 mol percent of reactant (3) is glycol, and that at least about 70 mol percent of all the hydroxy equivalents is present in the glycol. It is also preferred that a substantial portion of reactant (3) is a cycloaliphatic-dimethanol, e.g., up to 50 mole percent of a cycloaliphaticdimethanol such as 1,4-cyclohexanedimethanol.

More preferably the polyester has an inherent viscosity of from about 0.28 to about 0.38, an acid moiety of from about 75 to about 91, preferably about 75 to about 84, mole % isophthalic acid and conversely from about 25 to about 9, preferably about 25 to about 16, mole %

5-sodiosulfoisophthalic acid, and a glycol moiety of from about 45 to about 80, preferably about 45 to about 60, mole % diethylene glycol and conversely from about 55 to about 20, preferably about 55 to 40, mole % 1,4-cyclohexanedimethanol or ethylene glycol or mixtures thereof.

Even more preferably, the polyester comprises an acid moiety comprising from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

When a monovalent alkali metal ion is used, the resulting polyesters are less readily dissipated by cold water and more readily dissipated by hot water. When a divalent or a trivalent metal ion is used the resulting polyesters are not ordinarily easily dissipated by cold water but are more readily dissipated in hot water. It is possible to prepare the polyester using, for example, a sodium sulfonate salt and later by ion-exchange replace this ion with a different ion, and thus alter the characteristics of the polymer. The difunctional monomer component may also be referred to the difunctional sulfomonomer and is further described hereinbelow.

It is possible to prepare other salts of the polyester using, for example, a sodium sulfonate salt of the polyester and an appropriate ion-exchange resin.

The inherent viscosities (I.V.) of the particular water-dissipatable polymeric materials useful herein range from about 0.1 to about 1.0 determined according to ASTM D2857-70 procedure, in a Wagner Viscometer of Lab Glass, Inc., of Vineland, N.J., having a ¼ mL capillary bulb, using a polymer concentration about 0.25% by weight in 60/40 by weight of phenol/tetrachloroethane. The procedure is carried out by heating the polymer/solvent system at 120° C. for 15 minutes, cooling the solution to 25° C. and measuring the time of flow at 25° C. The I.V. is calculated from the equation $$(n)\,\frac{25°\,C.}{0.50\%} = \frac{\ln \frac{t_s}{t_o}}{C}$$

where:
(n) = inherent viscosity at 25° C. at a polymer concentration of 0.25 g/10 mL of solvent;
ln = natural logarithm;
$t_s$ = sample flow time;
$t_o$ = solvent blank flow time; and
C = concentration of polymer in grams per 100 mL of solvent = 0.25.

The units of the inherent viscosity throughout this application are in deciliters/gram. It is noted that higher concentrations of polymer, e.g., 0.50 g of polymer/100 mL solvent may be employed for more precise I.V. determinations.

Of course, it is contemplated that two or more polyester materials and/or two or more acrylic polymers can be used in the present invention. The water-dissipatable polymer can be made by known techniques, for example, by those disclosed in U.S. Pat. No. 3,734,874; 3,779,993; and 4,233,196; the disclosures of which are incorporated herein by reference in their entirety.

The acrylic polymers useful in the present invention are commercially available and/or can be made using conventional techniques known in the art. The molecular weight of the acrylic polymer is at least about 10,000 and preferred is at least about 200,000.

It is preferred that the acrylic polymer useful in the present invention has an acid number of about 200 or less; more preferred is less than about 70 and even more preferred is less than about 60. It is also preferred that the glass transition temperature (Tg) of the acrylic polymer is greater than about −20° to 100°, more preferably −20° to 0° C., and, in some cases, preferably 80° C. to 100° C.

The acrylic polymer of the present invention preferably comprises repeating units of the formula:

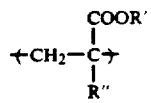

wherein R' is H, a straight, branched, or cyclic alkyl group of 1 to 20 carbon, preferably 1 to 10 carbon atoms, optionally substituted with up to 2 substituents such as $C_1$-$C_6$ alkoxy or halogen such as chloro- or bromo; and R" is H or methyl. More preferably R' is H, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl.

The acrylic polymer can optionally be styrenated and therefore further comprise repeating units of the formula:

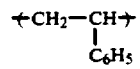

The acrylic polymer can also be a copolymer containing repeating units derived from an acrylonitrile monomer.

The acrylic polymer can be blended with the polyester material in pure form or either or both polymers can be in a mixture with water or an aqueous solution. The mixture of the acrylic polymer and water or aqueous solution can be in the form of a water borne alkali soluble resin, a colloidal dispersion, or emulsion. Preferred for use is an emulsion or dispersion of an acrylic polymer having a pH of about 7.5-9.0 and a Brookfield viscosity of about 200-1,000 centipoise (cp) at 25° C. Also preferred is an emulsion containing about 25-55 weight percent of acrylic polymer (more preferred about 45-50 weight percent) with the remainder of the emulsion being water or aqueous solution. If an aqueous solution is used to make the aqueous emulsion or dispersion of acrylic polymer, such solution will contain one or more additives typically used in the art in amounts of up to about 5 weight percent of the emulsion, preferably about 1 to about 3 weight percent.

Such additives can be emulsion stabilizers, surfactants, dispersants, antimicrobials or biocides, pH stabilizers, and the like. The additives described herein as suitable for use in the ink compositions are also suitable for use with the mixture of acrylic polymer and aqueous solution. The following Table 1 lists certain acrylic polymer emulsions (except for Joncryl 67 which is a solid or flake) commercially available and certain properties thereof. The acrylics having the tradename "Joncryl" are available from S. C. Johnson and Sons, Inc., Racine, Wis. 43403, U.S.A. and the acrylics having the tradename Vancryl are available from Vantage.

TABLE I

| Type | Commercial Name | % Polymer of Nonvolatile | Molecular Weight of Polymer | Acid No. of Polymer | Glass Trans. Temp. of Polymer | Min. Filming Temp. | pH of Emulsion | Viscosity of Emulsion 25° C., CPS |
|---|---|---|---|---|---|---|---|---|
| Acrylic Emulsion | Joncryl 77 | 46 | >200,000 | 55 | 21 | 20 | 8.3 | 500 |
| Styrenated Acrylic Emulsion | Joncryl 87 | 48.5 | >200,000 | 40 | 100 | >80 | 8.3 | 500 |
| Styrenated Acrylic Emulsion | Joncryl 134 | 44.0 | >200,000 | 35 | 95 | >80 | 8.3 | 200 |
| Styrenated Acrylic Emulsion | Joncryl 1535 | 37.0 | >200,000 | 30 | 20 | 15 | 7.5 | 200 |
| Acrylic Emulsion | Joncryl 537 | 46.0 | >200,000 | 40 | 44 | 42 | 9.0 | 150 |
| Styrenated Acrylic Emulsion | Joncryl 619 | 49.0 | >200,000 | 36 | 97 | 35 | 8.2 | 950 |
| Styrenated Acrylic Emulsion | Vancryl 930 | 46.0 | — | — | — | — | 8.7 | 200 |
| Acrylic Emulsion | Joncryl 74 | 48.5 | >200,000 | 50 | −16 | <5 | 8.3 | 500 |
| Solid | Joncryl 67 | 98 | 10,000 | 190 | 70 | — | — | — |

The aqueous solution or dispersion of water-dissipatable polyester to be blended with the acrylic polymer dispersion preferably comprises about 26 to 38 weight percent of polyester material with the remainder being water or an aqueous solution. The aqueous solution can be the same or be similar to the aqueous solution used to make the aqueous dispersion of an emulsion of acrylic polymer, with the amount of additives being present in an amount of up to about 5 weight percent, preferably about 1 to about 3 weight percent.

The polyester material can be dispersed in water or aqueous solution using the techniques described herein or known in the art and then blended with an aqueous dispersion or emulsion of acrylic polymer prepared by similar techniques, or blended with an aqueous emulsion or dispersion of acrylic polymer in a form commercially available. The following procedure can be used for dispersing the polyester in water: The water should be preheated to about 180° F. (82.22° C.) to about 200° F. (93.33° C.) and the polyester in pellet form is added rapidly to the vortex under high shear stirring. A Cowles Dissolver, Waring Blender, or similar equipment may be used. Once the water is heated to the desired temperature, additional heat input may not be required. Depending upon the volume prepared, dispersion of the pellets should be complete within 15 to 30 minutes stirring. Continued agitation with cooling may be desirable to prevent thickening at the surface due to water evaporation. Viscosities of the dispersions remain low up to polyester levels of 25 percent to 34 percent and viscosities increase sharply above these levels. Viscosities of the dispersions will be influenced by the degree of polymer dispersion obtained which is affected by the dispersing temperature, shear, and time. When hydantoin compounds useful within the context of this invention are added to the polyester, the viscosity drops as shown in Example III. Also, dispersibility of the polyester can be improved when the levels of sodiosulfoisophthalic acid are low by either the addition of solvents such as n-propyl alcohol, isopropyl alcohol, propylene glycol, ethylene glycol monobutyl ether, or ethylene glycol or by the addition of hydantoin compounds as described herein.

The ink compositions of this invention can be for any of the typical ink applications such as flexographic, gravure, letterpress, ink-jet, or screen-process printing applications. The ink compositions of the present invention have excellent adhesion to a wide variety of substrates including plastic films such as polyester, polyethylene or polypropylene; aluminum foil; glass; and paper.

The ink compositions of the present invention should have a pH of about 8.2 or lower; preferred is a pH of about 7 to 8. If the pH is higher than about 8.2, there is a danger of the polymer(s) hydrolyzing which may result in gelling of the system.

The hydantoins useful in component (B) of this invention are described in col. 2, lines 1–29 of U.S. Pat. No. 2,532,278, hereby incorporated by reference in its entirety. Preferred hydantoins useful in the present invention are 5,5-dialkylhydantoins of the general formula:

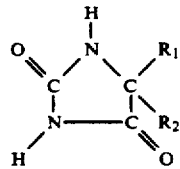

wherein $R_1$ and $R_2$ are hydrogen or monovalent aliphatic or cycloaliphatic groups such as methyl, ethyl, ethoxy ethyl, cyclohexyl, keto cyclohexyl, and the like. Alternatively, $R_1$ may be hydrogen and $R_2$ may be any hydrogen or monovalent aliphatic or cycloaliphatic groups such as the cycloaliphatic groups previously described herein. $R_1$ and $R_2$ may also together form a divalent aliphatic or cycloaliphatic group, preferably having from about 1 to about 4 carbon atoms as in the 5-disubstituted hydantoin derived from cyclohexanone, or cyclopentanone. However, it is generally preferred to use the 5,5-dialkyl hydantoin, more preferably, 5,5-dimethylhydantoin because this hydantoin is easily made by reacting acetone cyanhydrin with ammonium carbonate. The hydantoin-formaldehyde resin of component (B) of this invention is preferably present in an amount of about 0.5 to about 70 percent by weight where the total weight percentage of (A) and (B) is 100 percent by weight and where component (A) is the aqueous polyester dispersion. The weight percentage may vary widely within this range depending on the particular application desired.

Dimethylhydantoin-formaldehyde resins are generally prepared by the reaction of formaldehyde (or formalin solution) with a hydantoin as described by Jacobson in U.S. Pat. No. 2,155,863 and by Chadwick, et al, in U.S. Pat. No. 2,532,278. A preferred process is the process disclosed by Chadwick, et al, in U.S. Pat. No. 2,532,278, in which each mole of hydantoin is reacted with between 1.05 and 1.30 moles of formaldehyde in the presence of buffer salts. More particularly, formaldehyde and a hydantoin are brought together in the presence of a buffer salt taken from the group consisting of alkali metal salts of aliphatic mono- and di-carboxylic acids containing not to exceed 5 carbon atoms, alkali metal salts of boric acid and alkali metal salts of phosphoric acid; the salt being present in a sufficient concentration such that the initial pH is not less than 5. Although not essential, it is preferred that an iron deactivator, for example, an alkali metal phosphate be present in the reaction mass.

Examples of buffer salts are as follows: Sodium and potassium acetate, sodium and potassium propionate, sodium and potassium butyrate, sodium and potassium succinate, sodium tetraborate (borax) and trisodium phosphate. The buffer salt functions as a catalyst for the reaction. The rate of the reaction may be controlled to a considerable extent by varying amount of buffer salt used. This control of reaction time is important for manufacturing purposes because too long a reaction time may decrease the yield of the product, and too fast a reaction time makes the process difficult to handle on a large scale. It is therefore preferred that the buffer salt be used in a concentration of between 0.1% and 2.0%, based on the weight of the hydantoin. The quantity of the buffer salt will depend somewhat upon the particular buffer used. In any event, the buffer salt should be present in sufficient quantity that the initial pH value of the mixture is at least 5. Moreover, the particular buffer salt used will determine to some extent the nature of the resulting resin, i.e., its melting point, molecular weight, etc. In a preferred method of making the hydantoin-formaldehyde resin, the hydantoin, formaldehyde, and catalyst are brought together in the proportion of about 1 mole of the hydantoin to 1.05 to 1.30 moles formaldehyde and 0.1% to 2.0% of the catalyst, based on the weight of the hydantoin. The mixture is then heated to evaporate water and excess formaldehyde until the temperature reaches 120° C. to 140° C. Air is then passed through the mixture at a temperature of 120° C. to 160° C. until resin of the desired softening point is obtained. In the case of the production of a high melting point, it is sometimes necessary to raise the temperature to 170° C. to 180° C. toward the end of the reaction period to keep the product in a fluid form.

The reaction of a hydantoin with formaldehyde as described by Chadwick et al. yields a resin mixture of indefinite structure that varies with reaction conditions, final reaction temperature, catalyst and the ratio of formaldehyde to hydantoin employed. A typical segment of resinous mixture may be represented by the following structure:

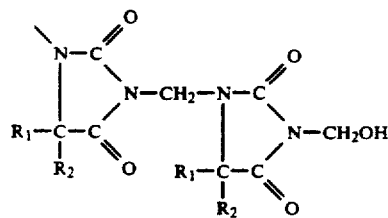

One may expect some reaction through the other amines.

Preferred hydantoin-formaldehyde resins have an initial softening point of at least 60° C. Even more preferred resins are condensation products of 5,5-dimethylhydantoin and have an initial softening point of at least 70° C. Hydantoin compounds useful within the scope of this invention are commercially available materials, such as HVWT 10 Clear Resin from Lawter International, Inc., 990 Skokie Blvd., Northbrook, Ill. 60062, or Dantoin DMF Resin from Lonza, 17-17, Route 208, Fair Lawn, N.J. 07410.

Component (B) is typically blended with the final product of any blends or aqueous dispersions made using component (A) and optional components (C), (D), or (E).

Component (C) is an optional component useful within the context of this invention. Component (C) is an acrylic polymer in an amount of about 10 to 55 percent, based on the total weight of component (A) and component (C), said acrylic polymer being compatible with the water-dissipatable polyester at a maximum acrylic polymer concentration of about 60/40 weight percent, preferably 40/60 weight percent, more preferably, 30/70 weight percent, of the total acrylic/polyester polymer solids.

For component (C), the following applies: By the phrase "an amount effective to increase the block resistance or water resistance properties of . . . " is meant that amount of acrylic polymer that, when added to the water-dissipatable polyester, will increase the block resistance and/or water resistance of an ink composition as compared to a comparable ink composition without said acrylic polymer. It is preferred that the water resistance of ink compositions made from the polymer blend of the present invention is at least good; more preferred is excellent. It is also preferred, concerning block resistance, that the ink compositions made from the polymer blend of the present invention do not block below about 100° F. (37.78° C.); more preferably do not block below about 120° F. and even more preferably to 220° F. (48.89° to 104.44° C.), for 5 seconds on a Sentinel Heat Sealer at 40 psi (275.79 kilopascal). Water resistance and block resistance can be determined by the procedures described in Examples 5 and 7 of U.S. Pat. No. 5,039,339 issued Aug. 13, 1991, incorporated herein by reference in its entirety.

By the term "compatible" is meant that a 60/40 weight blend of acrylic/polyester polymer (or a blend with less acrylic polymer) will not gel or have a significant increase in viscosity after being held at 120° F. (48.89° C.) for 24 hours or at room temperature for 14 days. By the term "gel" or "gelling" is meant that the blend is not pourable at room temperature. A significant viscosity increase after 24 hours at 120° F. (48.89° C.) is typically at least two or three times the viscosity at zero time. The acrylic polymers which are compatible at the higher acrylic concentrations of the acrylic/polyester blends are preferred. For example, acrylic polymers that are compatible in acrylic concentrations up to a 60/40 weight blend of acrylic/polyester are preferred over acrylic polymers that are compatible only up to a 50/50 weight blend of acrylic/polyester. Preferred acrylic polymers are compatible at acrylic concentrations of at least 30/70 (weight blend of acrylic/polyester) (i.e., at least 30 weight percent acrylic polymer) and more preferred acrylic polymers are compatible at acrylic concentrations of at least 40/60 (i.e., at least 40 weight percent acrylic polymer).

In the polymer blend of the present invention it is preferred that component (C) is present in an amount effective to increase the block resistance or water resistance properties of component (A) when formulated into an ink composition. Also, preferably, component (A) is present in an amount of about 45 percent to 90 percent, more preferably 55 percent to 70 percent; these percentages being based on the total weight of components (A) and (C).

Component (D) is also useful within the context of this invention. The term "component (D)" refers to a polymer having repeat units from (1) about 20 to about 80% by weight of a polymer comprising repeat units from styrene or one or more derivatives of styrene;

(2) about 15 to about 50% by weight, preferably about 15 to about 40%, more preferably about 20 to about 30%, of hydroxyalkyl (meth)acrylate; and (3) about 0 to about 60% by weight of alkyl (meth)acrylate.

A preferred aqueous dispersion of the invention contains about 95-60% of said component (D) and about 5-40% of said component (A), both said percentages being based on the combined weight of (A) and (D). Component (D) provides high solids aqueous polymer compositions. However, the preferred concentrations are 90-75% component (D) and 10-25% component (A). A blend of the invention would typically comprise component (A), component (B) and component (D) as described herein.

It is preferred that the polyester, component (A), has repeat units from isophthalic acid, sodiosulfoisophthalic acid, diethylene glycol, and another glycol selected from at least one of ethylene glycol and 1,4-cyclohexanedimethanol, and another polymer containing at least 20% by weight of repeat units from styrene or one or more derivatives of styrene, and 15% by weight of hydroxyalkyl (meth)acrylate.

It is also preferred in the aqueous dispersion that component (A) has a solids content of about 5 to 40 weight %, preferably about 10 to about 30 weight %, based on dry solids. It is preferred that the aqueous dispersion has a solids content of about 25 to about 45 weight % based on the total weight of said dispersion.

If desired, the styrene or styrene derivative(s) and the hydroxyalkyl (meth)acrylate of component (D), as described herein, may be mixed with additional monomers which are copolymerizable with the styrene or styrene derivatives, hydroxyalkyl (meth)acrylate. The comonomers may be present in amounts from 0 to about 60 weight percent. Polymer blends in which component (D) contains from about 35 to about 100% of a combination of the weight percents of styrene or styrene derivatives and hydroxyalkyl (meth)acrylate as described herein are preferred. The preferred total amount of comonomers is approximately about 0-40 weight percent.

One class of suitable comonomers are acrylic and methacrylic esters. Acrylic and methacrylic acid esters having from 1 to about 20 carbon atoms in the alcohol moiety are commercially available or can be easily prepared by known esterification processes. Preferred esters are the methyl, ethyl, butyl, 2-ethylhexyl and lauryl esters.

The acrylic and methacrylic acid esters may contain additional functional groups of the alcohol moiety, such as for example, hydroxyl, amine, halogen, ester, carboxylic acid, amide, nitrile and alkyl groups. Functionalized monomers such as blocked isocyanate acrylates and methacrylates may also be used to provide crosslinking sites for the preparation of curable systems.

Also, particularly useful as comonomers are lower alkyl diesters of unsaturated dicarboxylic acids. For example, $C_{1-4}$ diesters of maleic and fumaric acids, e.g., dibutyl maleate, may be used in copolymers with styrene or styrene derivatives and hydroxyalkyl (meth)acrylate or hydroxyalkylacrylate as described herein.

Other useful comonomers include acrylonitrile, acrylic acid, maleic anhydride, fumaric acid, methacrylic acid, acetoacetoxyethyl methacrylate and the corresponding acrylate, and halogenated vinyl monomers such as vinyl chloride and vinylidene chloride. These monomers may be used individually or may be used as mixtures to provide the desired properties. The preferred ratios of the various monomers can be readily determined by one skilled in the art and are dependent upon the particular application and desired properties of the water-dispersible polyester blend.

It is preferred that component (D) comprise repeat units from 0 to about 80 weight % of one or more comonomers selected from the group consisting of ethylene, acrylic acid, methacrylic acid, acrylic and methacrylic acid esters, acrylamides, unsaturated dicarboxylic acid diesters, vinyl chloride and maleic anhydride.

It is more preferred that component (D) comprise repeat units from at least 20% by weight of one or more comonomers selected from styrene, methylmethacrylate, ethylhexylacrylate and butylacrylate.

Component (E) of the invention comprises about 25 to 95 weight % of a styrene copolymer comprising: (a) about 30 to 100 weight % of repeating units from at least one styrene compound. Component (A) is also present at about 5 to about 75 weight %. It is preferred that the styrene polymer of component (E) of the invention also comprise (b) up to about 70 weight % of repeating units from at least one (meth)acrylate compound.

It is preferred that component (A) is present in a preferred blend of the invention in an amount of about 15 to about 50 weight %, component (E) is present in an amount of about 50 to about 98 weight %; and component (E) comprises about 50 to about 100 weight % of component (E)(a) and 0 to about 50 weight % of component (E)(b).

A preferred polymer blend of the invention is wherein component (A) is present in an amount of about 20 to about 40 weight %, component (E) is present in an amount of about 60 to about 80 weight %; and component (E) comprises about 70 to 100 weight % of component (E)(a) and 0 to about 30 weight % of component (E)(b).

It is also preferred that component (A) is present in a preferred blend of the invention in an amount of about 30 to about 99.5 weight %, preferably about 20 to about 40 weight %, component (B) is present in an amount of about 0.5 to about 70 weight %, preferably about 3 to about 20 weight %, and component (C) is present in an amount of about 1 to 55 weight %, preferably 1 to 25 weight %.

The styrene monomer useful for component (E) herein is preferably of the structure

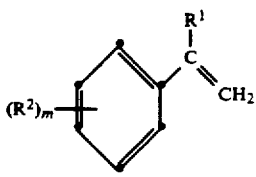

wherein $R^1$ is H or methyl, $R^2$ is a lower alkyl group of 1 to 6 carbon atoms, and m is an integer of 0 to 2. Preferably m is 0 or 1, and $R^2$ is methyl.

The most preferable styrene monomers for component (E) are styrene, α-methyl styrene, 4-methyl styrene, 3-methyl styrene, t-butyl styrene, and mixtures thereof.

The meth(acrylate) monomer for component (E) useful herein preferably is of the structure

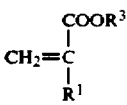

wherein $R^3$ is H or an alkyl group of 1 to 10 carbon atoms, optionally substituted with one or two substituents selected from the group consisting of $C_1$-$C_6$ alkoxy, hydroxy, epoxy, acetoacetoxy and halogen, and $R^1$ has the same meaning as previously defined.

Most preferably the (meth)acrylate monomer for component (E) is selected from the group consisting of butyl acrylate, ethyl acrylate, propyl acrylate, 2-ethylhexyl acrylate, methyl methacrylate, hydroxyethyl methacrylate, glycidyl (meth)acrylate, acetoacetoxyethyl methacrylate, and mixtures thereof.

In the process of preparing component (E), it is preferred that the monomers are polymerized in the presence of the sulfonate-group containing polymer (i.e., the polyester or polyesteramide).

The compositions of the present invention are prepared in aqueous dispersions. The monomers are generally added to an aqueous dispersion of the water-dispersible polyester and polymerized by free radical initiation in conventional emulsion or suspension polymerization processes. The preferred ratio of polyester to monomer in the dispersion prior to polymerization will vary widely and depends on the intended application.

The polymerization can be initiated by a water-soluble or water-dispersible free radical initiator known in the art such as sodium persulfate, or by an oil-soluble initiator such as benzoyl peroxide. Other useful initiators include redox initiators such as sodium or potassium persulfate, ammonium persulfate, sodium or potassium metabisulfite, and sodium or potassium formaldehyde sulfoxylate/Fe/hydrogen peroxide. The concentration of the initiator will generally range from about 0.01% to about 0.5% based on total reaction weight. A typical temperature range for the polymerization reaction is about 20° C. to about 90° C. with about 50° C. to about 80° C. being preferred.

The sulfonate-group containing polyesters which are used in the present invention typically become very viscous at concentrations above the 34 percent total solids. Thus, the reaction typically is begun with a polyester or polyesteramide dispersion that is about 30 percent total solids or less. However, the water-dispersible polyester blend dispersions are prepared at final total solids levels of up to about 20 percent to 60 percent for blends containing components (A), (B), and (E). A total solids content of about 35 percent to 50 percent for blends containing components (A), (B), and (E) is preferred.

For blends containing components (A), (B) and (D), the water-dispersible polyester blend dispersions are prepared at final total solids levels of up to about 45 percent to about 65 percent. For blends containing components (A), (B) and (D), a total solids level of about 25 percent to about 45 percent is preferred.

The increase in solids level is achieved during polymerization by controlling the amount of water, if any, which is added along with the monomer. By decreasing the amount of water added during the polymerization, increased total solids contents up to about 30 percent to 55 percent, preferably 35 percent to 45 percent, are possible. This increase in solids level can offer significant benefits for the use of the water-dispersible polyesters of the present invention.

The copolymerization of the styrene and acrylate monomer(s) in the presence of water-dispersible polyester for component (D) may be conducted batchwise, semi-batch or in a continuous manner.

In a preferred embodiment, the sulfonate group-containing polyester is prepared, generally by melt phase polymerization techniques which are well known in the art. The polymers as prepared may be directly dispersed in hot water or extended into rods and chopped into pellets. These pellets can later be dispersed in hot water if desired. An aqueous dispersion containing about 5-40 weight %, preferably from about 10 percent to 34 percent total solids, is prepared from the polyester directly. A mixture of one or more monomers and the polymerization initiators may then be added to the aqueous dispersion of the polyester and polymerization initiated to produce an aqueous dispersion. When using as a persulfate initiator, for example, the polymerizations are generally conducted at temperatures of about 70° C. to about 90° C. For component (D), usually a small amount of initiator is added toward the end of the copolymerization in order to react as much of the styrene and hydroxyethyl (meth)acrylate or hydroxypropylacrylate monomers as possible. For component (D), it is desirable to have less than 100 ppm of unreacted vinyl/acrylic monomer(s) in the final product and preferably less than 50 ppm unreacted monomer(s). The aqueous dispersion of component (D) can be prepared with total solids contents from about 10 percent to about 55 percent.

In another mode of operation for the preparation of component (D), some of the aqueous polyester dispersion is added to the reaction vessel while the vinyl monomers and initiator are dispersed in another portion of the polyester dispersion. After heating the reaction mixture to the desired temperature, the portion containing polyester, vinyl monomers and initiator is gradually added with stirring. The translucent latexes obtained have virtually no coagulum.

The aqueous dispersion of component (D) prepared in this manner may be used directly as paper adhesives and coatings. Viscosity control agents, colorants, dyes, stabilizers, etc., may be added to the aqueous dispersions to prepare specific adhesives and coatings.

The total solids content of the aqueous dispersion is controlled by the relative amounts of polymers which are used in the polymerization reaction and by the amount of water added during polymerization. As noted above, dispersions of sulfonate group-containing polymers can practically be prepared only at total solids contents up to about 34 percent. Above 34 percent, these dispersions become highly viscous and difficult to process. Higher total solids contents can be obtained by increasing the amount of monomer and decreasing the amount of polyester which are used in the polymerization reaction.

The specific amounts of component (A) and component (D) can be chosen by one skilled in the art depending on the specific monomers, the desired total solids content and the application for which the aqueous dispersion is intended.

Aqueous dispersions for component (D) can be formulated by those skilled in the art so that excellent wet block resistance in overprint varnish applications as well as excellent printability, adhesion, and water-resistance in ink applications for paper, film and foil results. However, these properties are dependent on latex composition, particularly on the composition of the styrene/(meth)acrylate co- or terpolymer. The particle size of these aqueous polymer blends, component (D), generally range from $\leq 300$ nm, and more preferably from about 40 nm to about 200 nm. It is believed that the hydroxyethyl (meth)acrylate or hydroxypropyl acrylate monomers are responsible for providing polymer blends with these small particle sizes. It is also believed that the hydroxyethyl (meth)acrylate or hydroxypropyl acrylate serves as a reactive cosolvent which lowers the interfacial tension between the monomer droplets and the aqueous phase, thereby lowering the monomer droplet size and consequently reducing the final particle size. The hydrophilic hydroxyethyl (meth)acrylate or hydroxypropyl acrylate may also react with the hydrophobic styrene and/or (meth)acrylate monomer units to form oligomeric surfactant molecules in situ. Such an interaction would allow a low emulsion particle size to be maintained even with a reduction in the amount of the water-dispersible polyester (i.e., primary surfactant) present in the latex. Finally, the presence of the hydroxyethyl (meth)acrylate or hydroxypropyl acrylate reduces the amount of coagulum formed during latex preparation.

The dispersions or blends according to this invention may be used by applying them as a coating to a substrate such as paper followed by drying to leave a residue of solids in the form of a coating. Alternately, a second substrate can be applied prior to drying to form a bond between the substrates.

Also preferred is a method of preparing an aqueous polymer dispersion which comprises forming an aqueous dispersion having the components of polyester (A) and component (D) as described herein and polymerizing components b(1), b(2) and b(3) of component (D) in the aqueous dispersion, to thereby obtain an aqueous dispersion of a blend of polymers with a total solids content of up to about 60%.

In the ink compositions of the present invention, it is preferred that component (B) of the invention is present in an amount of about 0.5% to about 70% by weight, preferably 5% to 50% by weight, more preferably 10% to 30% by weight, and that components (A), (C), (D), or (E) are present in an amount of about 3.0 to about 40% by weight, that about 0.00% to about 45% by weight of a colorant is present, that about 0% to 15.0% by weight of an organic, polar solvent, preferably about 0 to about 10% by weight, such as 1- or 2-propanol, ethanol, 2-butoxyethanol, 2-ethoxyethanol is present, and that water satisfies any remaining percentage by weight so that the total percentage by weight of all of the components is equal to 100%.

If the ink is a finished ink, it is preferred that at least about 0.5 weight percent of colorant is present. More typically, in inks, at least about 15 weight percent of colorant is present. If the ink composition contains an organic pigment, typically such an organic pigment is present in an amount of about 20 weight percent or less of the total composition. If the ink composition contains an inorganic pigment, typically such inorganic pigment is present in an amount of about 30 weight percent or less of the total composition. However, for some pigments such as titanium dioxide, the pigment can be present in an amount as high as about 60 percent.

Clearly, other additives, such as waxes, clays, surfactants, defoamers, viscosity modifiers, etc., may be added to the ink to modify or enhance end-use properties. The ink compositions can optionally contain up to about 20 weight percent, preferably up to about 10 weight percent, more preferably up to about 5 weight percent, of one or more such additives. Such additives include waxes such as Jonwax 26, Jonwax 120 (available from S. C. Johnson and Sons, Inc., Racine, Wis. 43403; U.S.A.), or Vanwax 35 (available from Vantage, Garfield, N.J. 07026); surfactants such as Surfynol 104 and Surfonyl 440 (available from Air Products and Chemicals, Allentown, Pa. 18105); modifiers (for example, defoamers) such as WBT 409, Resolv (available from Vantage), Carbowet 990 (available from Vantage), Aerosol OT 70 (available from McIntyre, Chicago, Ill. 60632), Foamaster 111 (available from Henkel Corporation, Morristown, N.J. 07960); alcohols such as n-propyl alcohol, isopropyl alcohol, propylene glycol, ethylene glycol monobutyl ether, or ethylene glycol; biocides; pH stabilizers; dispersants; thickeners such as Acrysol RM-825 (available from Rohm & Haas, Philadelphia, Pa. 19105); and the like.

The ink compositions of the present invention should have a pH of about 8.2 or lower; preferred is a pH of about 6 to 8. If the pH is higher than about 8.2, there is a possibility of the polymer(s) hydrolyzing which may result in gelling of the system.

The ink compositions of this invention can be for any of the typical ink applications such as flexographic, gravure, letterpress, ink-jet, or screen-process printing applications. The ink compositions of the present invention have excellent adhesion to a wide variety of substrates including plastic films such as polyester, polyethylene or polypropylene; aluminum foil; glass; and paper.

The inks, overprints, and primers of this invention can be prepared, for example, as disclosed in U.S. Pat. No.4,148,779, which is incorporated herein by reference in its entirety.

The present invention is not limited to any type of dye, pigment, filler, or the like, all of which are hereinafter included in the term "colorant," and can accommodate any colorant which can be dispersed, milled, mixed, blended or dissolved in any manner in either the polymer blend, water or aqueous polymer system.

As appreciated in the art, the exact components and properties of components desired for any given ink application can vary, and, therefore, routine experimentation may be required to determine the optional components and proportions of components for a given application and desired properties.

Exemplary useful C.I. pigments and solvent dyes for use in the present invention are given in the following table:

| Pigments and Solvent Dyes | |
|---|---|
| Generic Name | C.A. Index/Chemical Name |
| C.I. Pigment Yellow 17 | Butanamide, 2,2'-[(3,3'-dichloro[1,1'-biphenyl] 4,4'-diyl)bis(azo)bis [N-(2-methoxyphenyl)-3-oxo- |
| C.I. Pigment Blue 27 | Ferrate (4-1), hexakis (cyano-C)-ammonium iron (3+) (1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethyl-amino)-3-(ethylimino)-2,7-dimethyl-3H-xanthen-9-yl]-, ethyl ester, w/molybdenum tungsten hydroxide oxide phosphate |
| C.I. Pigment Red 81:3 | Benzoic acid, 2-[6-ethyl-amino)-3-ethylimino)-2,7-dimethyl-3H-xanthen-9-yl]-, ethyl ester, molybdate-silicate |
| C.I. Pigment Red 81:x | Benzoic acid, 2-[6-(ethyl-amino)-3-(ethylimino)-2,7-dimethyl-3H-xanthen-9-yl]-, ethyl ester, molybdate-phosphate |
| C.I. Pigment Yellow 83 | Butanamide, 2,2'-[(3,3'-dichloro[1,1'-biphenyl]-4,4'-diyl)bis(azo)bis[N-(4-chloro-2,5-dimethoxy-phenyl)-3-oxo- |
| C.I. Pigment Red 57:1 | 2-Naphthalenecarboxylic acid, 3-hydroxy-4-[(4-methyl-2-sulfophenyl)azo]-, calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Green 7 | C.I. Pigment Green 7 |
| C.I. Pigment Blue 61 | Benzenesulfonic acid, [[4-[[4-phenylamino)-phenyl]-[4-(phenylimino)-2,5-cyclohexadien-1-ylidene]methyl]-phenyl] amino]- |
| C.I. Pigment Red 48:1 | 2-Naphthalenecarboxylic acid, 4-[(5-chloro-4-methyl-2-sulfophenyl)azo]-3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy-, calcium salt (1:1) |
| C.I. Pigment Violet 1 | Ethanaminium, N-[9-(2-carboxyphenyl)-6-(diethyl-amino)-3H-xanthen-3-ylidene]-N-ethyl-, molybdatetungstate-phosphate |

-continued

| Pigments and Solvent Dyes | |
|---|---|
| Generic Name | C.A. Index/Chemical Name |
| C.I. Pigment White 6 | Titanium oxide ($TiO_2$) |
| C.I. Pigment Blue 15 | Copper, [29H, 31H-phthalocyaninato (2-)-$N^{29}$, $N^{30}$, $N^{31}$, $N^{32}$]-, (Sp-4-1)- |
| C.I. Pigment Yellow 12 | Butanamide, 2,2'-[(3,3'-dichloro[1,1'-biphenyl]-4,4'-diyl)bis(azo)]bis[3-oxo-N-phenyl- |
| C.I. Pigment Blue 56 | Benzenesulfonic acid, 2-methyl-4-[[4-[[4-[(3-methylphenyl)amino] phenyl]-[4-[(3-methyl-phenyl)-imino]-2-5-cyclohexadien-1-ylidene]methyl]-phenyl] amino]- |
| C.I. Pigment Black 7 | Carbon black |
| C.I. Pigment Yellow 14 | Butanamide, 2,2'-[(3,3'-dichloro [1,1'-biphenyl]-4,4'-diyl)bis(azo)]bis-[N-(2-methylphenyl)-3-oxo- |
| C.I. Pigment Red 48:2 | 2-Naphthalenecarboxylic acid, 4-[(5-chloro-4-methyl-2-sulfophenyl)-azo]-3-hydroxy-, calcium salt (1:1) |
| C.I. Pigment Blue 15:3 | Copper, [29H, 31H-phthalocyaninato (2-)-$N^{29}$, $N^{30}$, $N^{31}$, $N^{32}$]-, (SP-4-1)- |
| C.I. Pigment Yellow 1 | Butanamide, 2-[(4-methyl-2-nitrophenyl)azo]-3-oxo-N-phenyl- |
| C.I. Pigment Yellow 3 | Butanamide, 2-[(4-chloro-2-nitrophenyl)azo]-N-(2-chlorophenyl)-3-oxo- |
| C.I. Pigment Yellow 13 | Butanamide, 2,2'-[(3,3'-dichloro[1,1'-biphenyl]-4,4'-diyl)bis(azo)]bis [N-(2,4-dimethylphenyl)-B-oxo- |
| C.I. Pigment Orange 16 | Butanamide, 2,2'-[(3,3'-dimethoxy[1,1'-biphenyl]-4,4'-diyl)bis(azo)]bis [3-oxo-N-phenyl- |
| C.I. Pigment Yellow 55 | Butanamide, 2,2'-[(3,3'-dichloro[1,1'-biphenyl]-4,4'-diyl)bis(azo)]bis [N-(4-methylphenyl)-3-oxo- |
| C.I. Pigment Red 41 | 3H-Pyrazol-3-one,4,4'-[(3,3'-dimethoxy[1,1'-biphenyl]-4,4'-diyl)bis (azo)]bis[2,4-dihydro-5-methyl-2-phenyl- |
| C.I. Pigment Orange 34 | 3H-Pyrazol-3-one,4,4'-[(3,3'-dichloro[1,1'-biphenyl]-4,4'-diyl)bis (azo)]bis[2,4-dihydro-5-methyl-2-(4-methylphenyl)- |
| C.I. Pigment Blue 62 | 4,4'-Bis(diethylamino) benzophenone condensed with N-ethyl-1-naphthyl-amine in toluene with phosphorous oxychloride and converted to the copper ferrocyanide salt (PTMA salt in P. Blue 1) |
| C.I. Pigment Red 22 | 2-Naphthalenecarboxamide, 3-hydroxy-4-[(2-methyl-5-nitrophenyl)azo]-N-phenyl- |
| C.I. Pigment Red 170 | 2-Naphthalenecarboxamide, 4-[[(4-(aminocarbonyl) phenyl]azo-N-(2-ethoxy- |

Pigments and Solvent Dyes -continued

| Generic Name | C.A. Index/Chemical Name |
|---|---|
| C.I. Pigment Red 88 | phenyl)-3-hydroxy-Benzo[b]thiophen-3(2H)-one, 4,7-dichloro-2-(4,7-dichloro-3-oxobenzo[b]-thien-2(3H)-ylidene)- |
| C.I. Pigment Yellow 151 | A diazotized aniline derivative coupled with an acetoacetyl derivative of 5-aminobenzimidazolone |
| C.I. Pigment Violet 23 | Diindolo[3,3',2'm]tri-phenodioxazine, 8-18-dichloro-5,15-diethyl-5,15-dihydro- |
| C.I. Pigment Red 184 | A diazotized substituted aniline coupled with a derivative of 3-hydroxy-2-naphthanilide |
| C.I. Pigment Blue 1:2 | Ethanaminium, N-[4-[[4-(diethylamino)phenyl][4-(ethylamino)-1-1 naphthalenyl]methylene]-2,5-cyclohexadien-1-ylidene]-N-ethyl-, [orthosilicato(4-)] hexatriacontaoxo-dodecamolybdate(4)-(4:1) |
| C.I. Pigment Red 3 | 2-Naphthalenol, 1-[(4-methyl-2-nitro-phenyl)azo]- |
| C.I. Pigment Blue 15:1 | Copper, [29H, 32H-phthalocyaninato(2-)-$N^{29}$, $N^{30}$, $N^{31}$, $N^{32}$]-, (SP-4-1)- or Copper, [chloro-29H, 31H-phthalocyaninato (2-1)-$N^{29}$, $N^{30}$, $N^{31}$, $N^{32}$]- |
| C.I. Pigment Red 23 | 2-Naphthalenecarboxamide, 3-hydroxy-4-[(2-0methoxy-5-nitrophenyl)azo]-N-(3-nitrophenyl)- |
| C.I. Pigment Red 112 | 2-Naphthalenecarboxamide, 3-hydroxy-N-(2-methyl-phenyl)-4-[(2,4,5-tri-chlorophenyl)azo]- |
| C.I. Pigment Yellow 126 | A tetrazotized derivative of 3,3-dichlorobenzidene coupled with a derivative of acetoacetanilide |
| C.I. Pigment Red 169 | 3-Ethylamino-p-cresol condensed with phthalic anhydride, esterified with ethanol and a mineral acid, and converted to the copper ferrocyanide complex (chloride salt is C.I. Basic Red 1, PTMA salt is P. Red 81:1). |
| C.I. Pigment Orange 13 | 3H-Pyrzaol-3-one, 4,4'-[(3,3'-dichloro [1,1'-biphenyl]-4,4'-diyl)bis(azo)]bis[2,4-dihydro-5-methyl-2-phenyl- |
| C.I. Pigment Red 10 | 2-Naphthalenecarboxamide, 4-[(2,5-dichlorophenyl) azo]-3-hydroxy-N-(4-methylphenyl)- |
| C.I. Pigment Blue 1:X | Ethanaminium, N-[4-[[4-(diethylamino)phenyl][4-(ethylamino)-1-naphtha-lenyl]methylene]-2,5-cyclohexadien-1-ylidene]-N-ethyl-, molybdate-phosphate |
| C.I. Pigment Yellow 42 | Iron oxide ($Fe_2O_3$) hydrate |
| C.I. Pigment Red 101 | Iron oxide ($Fe_2O_3$) |
| C.I. Pigment Brown 6 | Iron oxide ($Fe_2O_3$), some FeO and $Fe_2O_3.H_2O$ |
| C.I. Pigment Brown 7 | Iron oxide ($Fe_2O_3$) plus varying amounds of clay |
| C.I. Pigment Brown 7:X | $Fe_2O_3 \cdot x\ MnO_2$ with varying amounts of clay |
| C.I. Pigment Black 11 | $FeO.Fe_2O_3$ |
| C.I. Pigment Metal 1 | Aluminum |
| C.I. Pigment Metal 2 | Copper, zinc |
| C.I. Solvent Yellow 135 | |
| C.I. Basic Red 1 | |
| C.I. Basic Violet 11 | |
| C.I. Solvent Blue 44 | |
| C.I. Solvent Blue 38 | |
| C.I. Solvent Black 45 | |
| C.I. Solvent Orange 41 | |
| C.I. Solvent Red 124 | |
| C.I. Solvent Red 127 | |
| C.I. Solvent Yellow 48 | |
| C.I. Solvent Blue 45 | |
| C.I. Solvent Yellow 83:1 | |
| C.I. Basic Yellow 40 and 42 | |

In the following examples a hand proofer is employed which provides reasonable facsimiles of prints obtained by the flexographic printing processes as discussed in U.S. Pat. No. 3,607,813 and is typically used to prepare roll-outs or proofs for laboratory testing on a wide variety of substrates. The wire-wound rod is typically used to prepare drawdowns of inks on a variety of substrates. These rods apply a uniform wet film thickness to the substrate, and after drying, the drawdowns are ready for testing. For exemplary details of such proofer equipment and use, see the publication "Gardco 1983-1984 Handbook of Paint Testing, Corrosion Control and Laboratory Instruments" of the Paul N. Gardner Company, Inc., 281 D Commercial Blvd., Suite 205 Lauderdale by the Sea, Fla. 33308-4491.

For the following examples, poly-5,5-dimethylhydantoin is sometimes referred to as "PDMH".

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise described. All percentages are by weight unless otherwise described.

EXAMPLE I—Polyester Preparation

A mixture of 79.5 g (0.41mole) of dimethyl isophthalate, 26.6 g (0.09 mole) of dimethyl-5-sodiosulfoisophthalate, 54.1 g (0.51mole) of diethylene glycol, 37.4 g (0.26 mole) of 1,4-cyclohexanedimethanol, 1.4 mL of a 1.0%

(based n Ti) catalyst solution of titanium tetraisopropoxide, and 0.74 g (0.009 mole) of sodium acetate buffer is stirred and heated for two hours at 200°-220° C. The temperature is then raised to 275° C. and a vacuum of 0.3 mm is applied. Heating and stirring are continued for 1 hour under these conditions. After cooling, the polymer obtained has an I.V. of 0.36 and is dissipatable in hot water to the extent of about 25 wt. % to give a clear, slightly viscous solution. The composition of the acid moieties of this polyester material is analyzed to be 82 mole % isophthalic acid residue and 18 mole % 5-sodiosulfoisophthalic acid residue, and of the glycol moieties is analyzed to be 54 mole % diethylene glycol and 46 mole % 1,4-cyclohexanedimethanol. This material is designated hereinafter as "Polymer A".

EXAMPLE II(A)

In a stirred, 3-necked, round bottom flask equipped with a stirrer, a condenser, a thermometer, a heating mantle, Polymer A (33 parts) was added to water (67 parts). With agitation, the mixture was heated for one hour at 90° C., then cooled to room temperature.

EXAMPLE II(B)

A dispersion was made as in Example II(A) except that 10 parts of n-propyl alcohol was added at 60° C. on the cool down cycle to yield a final product that was 29.0 parts Polymer A, 10.0 parts n propyl alcohol and 61 parts water.

EXAMPLE III—Example of the Invention

In a Waring blender, 100 g of dispersion from Example II was mixed with 50 g of HVWT-10 Clear Resin, a poly-5,5-dimethylhydantoin polymer from Lawter International, Inc., for 30 minutes using moderate agitation. The viscosity of this mixture was 9.4 sec. less than that of Example II (31.8 sec. vs. 41.2 sec., #2 Zahn Cup) though the solids content increased from 33.0% to 55.3%. Viscosity was measured per ASTM-D4212-82 in a #2 Zahn Cup.

EXAMPLE IV—Example of the Invention

A black ink concentrate was made using a Waring blender containing the following:

| | |
|---|---|
| 47.5% | dispersion of Example II |
| 50.0% | Black Millbase - (Available from EASTEK Inks as Black Millbase 31000) |
| 2.5% | Blue Millbase - (Available from EASTEK Inks as B.S. Blue Millbase 31042) |

The concentrate was mixed for 10 minutes with low speed agitation. Inks were then made from this concentrate and (a) the dispersion from Example II or (b) the dispersion from Example III to give pairs of inks varying essentially in composition only by the poly-5,5-dimethylhydantoin content. The components for each sample Were placed in 1-oz. jars and the samples were shaken for 1 minute on a Brinkman Vibratory Mill at ~1900 frequencies per minute. The compositions are given in Table II.

TABLE II

| Sample # | Concentration on Wet Weight, % | | |
|---|---|---|---|
| | Black Ink Concentrate | Dispersion, Example II | Dispersion, Example III |
| 1 | 85.7 | 14.3 | 0.0 |
| 2 | 85.7 | 0.0 | 14.3 |

TABLE II-continued

| Sample # | Concentration on Wet Weight, % | | |
|---|---|---|---|
| | Black Ink Concentrate | Dispersion, Example II | Dispersion, Example III |
| 3 | 66.7 | 33.3 | 0.0 |
| 4 | 66.7 | 0.0 | 33.3 |
| 5 | 50.0 | 50.0 | 0.0 |
| 6 | 50.0 | 0.0 | 50.0 |

Table III shows the polymer composition of the samples in Table II. The Polymer A content as in Example 1 of the black and blue millbases was 15.5% and 15.0%, respectively

TABLE III

| Sample # | Concentration on Wet Weight, % | | Concentration on Dry Polymer, Wt. % | |
|---|---|---|---|---|
| | Polymer, Example 1 | 5,5-Polydimethylhydantoin | Polymer, Example 1 | 5,5-Polydimethylhydantoin |
| 1 | 25.2 | 0.0 | 100.0 | 0.0 |
| 2 | 23.5 | 4.76 | 83.16 | 16.8 |
| 3 | 26.7 | 0.0 | 100.0 | 0.0 |
| 4 | 23.1 | 11.1 | 67.7 | 32.3 |
| 5 | 28.4 | 0.0 | 100.0 | 0.0 |
| 6 | 22.8 | 16.5 | 57.9 | 42.1 |

Ink Samples 1-6 of Table III were applied to 55 lb. clay-coated paper using a 200 line anilox Flexo Handproofer. Samples 1 and 2 were proofed side-by-side, as were Samples 3 and 4 and 5 and 6. Samples 1, 3 and 5 were the controls. Using a Macbeth Densitomer, the optical density (OD) of each sample was measured. An increase in optical density was calculated as follows:

$$\% \text{ Increase} = \frac{OD \text{ Sample} - OD \text{ Control}}{OD \text{ Control}} \times 100$$

The results are given in Table IV.

TABLE IV

| Sample # | Increase in Optical Density, % |
|---|---|
| 1 | Control |
| 2 | 3.3 |
| 3 | Control |
| 4 | 7.1 |
| 5 | Control |
| 6 | 18.1 |

EXAMPLE V—Example of the Invention

Ink Samples 5 and 6 of Example IV were applied as in Example IV to polyester film and foil-laminated paper. When evaluated as in Example IV, the increase in optical density was 20.2% and 9.1%, respectively.

EXAMPLE VI—Example of the Invention

Ink Samples 5 and 6 of Example IV were applied to polyethylene film (surface energy =38 dynes/cm) as in Example IV. When evaluated as in Example IV, the increase in optical density was 708.4%.

EXAMPLE VII—Example of the Invention

The adhesion of the samples from Example VI was evaluated by applying Scotch 810 tape to the printed sample, then quickly pulling the tape from the printed sample. Substantially all of the ink was removed from Sample 5 (control) while substantially none of the ink was removed from Sample 6.

EXAMPLE VIII—Example of the Invention

A wet film thickness of 0.0005 inch of Samples 5 and 6 from Example IV was applied to Opacity Chart, Form N2C, a test card from The Leneta Company, Ho-Ho-Kus, N.J. 07423, using a #2 RK Rod from Paul N. Gardner Company, Inc., Pompano Beach, Fla. 33060. The samples were applied side-by-side. The drying rate of the samples at room temperature was determined by touching the samples over the black portion of the card at 30 second intervals until no marks were observed in the film. Sample 5 (control) dried in 3 minutes, while Sample 6 dried in 5.5 minutes.

EXAMPLE IX—Example of the Invention

The following inks were made using a series of dyed poly-5,5-dimethylhydantoins purchased from Lawter International, Inc., Northbrook, Ill. 60062. The components were placed in screw capped bottles, and the bottles were shaken for 6 hours on a Red Devil Paint Shaker to effect solution. The dyed poly-5,5-dimethylhydantoin series have the trade name Hi-Viz Fluorescent Pigments with the following product codes:

| | |
|---|---|
| 1 | HVWT 17 |
| 2 | HVWT 18 |
| 3 | HVWT 22 |
| 4 | HVWT 30 |
| 5 | HVWT 36 |
| 6 | HVWT 41 |
| 7 | HVWT 45 |
| 8 | HVWT 54 |
| 9 | HVWT 16 |

The ink formulations are given below:
30.0% dyed poly-5,5-dimethylhydantoin (HVWT series)
51.5% Product of Example II(B)
18.5% Water These inks were applied at a wet film thickness of 0.0005 inch with a #2 RK Rod on a Leneta Opacity Chart, Form N-2C, and were allowed to air dry. The dried inks were very transparent and highly glossy. The wet inks showed no significant change in viscosity or shade after one month.

EXAMPLE X—Example of the Invention

(A) Polyester Preparation

A polyester with a composition of 91 mole % isophthalic acid, 9 mole % 5-sodiosulfoisophthalate, 75 mole % 1,4-cyclohexanedimethanol, and 25 mole % diethylene glycol, based on the total of all acid and hydroxy moiety repeating units being equal to 200 mole % was prepared. The polyester is prepared by conventional polyesterification methods as described in Example I and in U.S. Pat. Nos. 3,546,008; 3,734,874; and 3,779,993. The polyester is dispersed by the method shown in part (B).

(B) Dispersibility

The following formulations listed in Table V were placed into screw capped, 4-oz. jars which were placed in a water bath at 90°–95° C. for approximately 6 hours. The jars were shaken occasionally by hand.

TABLE V

| | Concentration, on Wet Weight | | | Concentration, on Dry Weight Polymer | |
|---|---|---|---|---|---|
| Formulation No. | Polymer[2], wt. % | Poly-5,5-Dimethylhydantoin[1], wt. % | $H_2O$ wt. % | Polymer[2], wt. % | Poly-5,5-Dimethylhydantoin[1], wt. % |
| 1 | 25.00 | 0.00 | 75.00 | 100.00 | 0.00 |
| 2 | 18.75 | 6.25 | 75.00 | 75.00 | 25.00 |
| 3 | 12.50 | 12.50 | 75.00 | 50.00 | 50.00 |

[1]HVWT 10 Clear Resin, Lawter International, Inc.
[2]Polymer as described in Example X(A)

The following results were obtained for Formulations 1,2 and 3 in Table V after the procedure followed in (A) and (B):

Formulation 1

Pellets were hard and unswollen with little evidence of attack.

Formulation 2

Pellets were swollen and white leaving very little free $H_2O$ visible.

Formulation 3

Pellets were completely dispersed into a fluid which resulted in a slightly opaque dispersion.

EXAMPLE XI—Control Dispersion Preparation

A control dispersion containing 30% polymer solids of a polyester as prepared in Example X(A) and 2% n-propanol (NPA) was made as given below:

500.85 g distilled water and 79.0 g n-propanol were weighed into a 3-necked flask. The sample was heated to 75° C. 210 g of polymer as described in Example X(A) was introduced at 52.5 g per addition. The dispersion was stirred at reflux (about 85° C.) for 1 hour. A still-head type condenser was then used to remove 104.2 ml (89.6 g) of azeotrope (boiling pt. ~86° C., 72% n-propanol, 28% water, density of 0.86).

EXAMPLE XII—Film Formation and Gloss

The control, as prepared in Example XI, was drawn-down beside the sample dispersion from Table V, Formulation 3, with a #2 RK Rod on an Opacity Chart (Leneta, Form N2C) using a K-Coater. The control was semi-opaque and discontinuous while the sample was glossy, transparent and continuous. The gloss measured at an angle of 60° using DR Lange Reflektometer was 34.9 for the control and 68.7 for the sample.

EXAMPLE XIII—Example of the Invention

(A)—Polyester Preparation

A polyester with a composition of 80 mole % isophthalic acid, 20 mole % 5-sodiosulfoisophthalate, 80 mole % 1,4-cyclohexanedimethanol and 20 mole % ethylene glycol, based on the total of all acid and hydroxy moiety repeating units being equal to 200 mole % was prepared. The polyester was prepared generally as in Example I. The I.V. was 0.220.

(B)—Preparation of Dispersion of Polymer from Example XIII(A)

Dispersion was effected by adding 25 g polymer in Example XIII(A) to 75 g distilled water and heating at 90° C. for 6-8 hours. There was no agitation except for an occasional shaking by hand. The resulting dispersion was cloudy and tended to separate into layers upon sitting overnight. The sample was heated in a screw cap jar in a water bath.

(C)—Preparation of the Polymer from Example XIII(A)

Same as above only 50 g total was made using the following formula:

| 12.5% | 6.25 g | Polymer in Example XIII (A) |
|---|---|---|
| 12.5% | 6.25 g | poly-5,5-dimethylhydantoin (HVWT10 Clear Resin, Lawter International) |
| 75.0% | 37.50 g | distilled water |

All but a few of the polyester pellets went into a slightly translucent dispersion very quickly (<1 hour). At the end of 4 hours, all the pellets were dispersed. The viscosity was low compared to the product of Example XIII(B). No separation was observed after setting overnight.

EXAMPLE XIV—Example of the Invention

(A)—Polymer Preparation

A polyester with a composition of 97 mole % isophthalic acid, 3 mole % 5-sodiosulfoisophthalate, 75 mole % 1,4-cyclohexanedimethanol and 25 mole % diethylene glycol, based on a total of all acid and hydroxy moiety repeating units being equal to 200 mole % was prepared substantially as in Example X.

(B)—Dispersion Preparation

Into a 300 ml, 3-necked, round-bottomed flask equipped with a thermometer, a H$_2$O cooled condenser, and a Teflon® paddle stirrer powered by a Heller motor was charged 18.5 g of n propanol and 55.8 g of distilled H$_2$O. When the water/alcohol was heated to reflux, 25 g of polymer was charged into the pot. The mixture was stirred at reflux for 15 hours. A thin, milky white dispersion was obtained.

(C)—Preparation and Evaluation of Polymer (A)/Poly-5,5-Dimethylhydantoin Mixtures

| Formula |
|---|
| 10.0 g dispersion of Step (B) |
| 0.5 g poly-5,5-dimethylhydantoin (HVWT10 Clear Resin, Lawter International, Inc.) |

The formula was charged into a 1-oz. wide-mouthed jar which was then shaken for 15 minutes to effect solution. The dispersions from Step B (control) and Step C (sample) were drawn down on a piece of glass with a #1 RK rod. After air drying for 4 minutes at room temperature, the glass was placed under warm tap water and was washed under running water for 2 minutes. The sample was completely removed, while the control was substantially intact. The experiment was repeated drying for 1 hour. Neither the sample nor the control was greatly affected. Removal required scrubbing with a pot scrubber, thus showing that the poly-5,5-dimethylhydantoin at this concentration aids rewetting without affecting the final water resistance.

EXAMPLE XV—Example of the Invention

(A)—Polyester Dispersion

A dispersion containing a polyester with a composition of 50.3% terephthalic acid, 46.1% isophthalic acid, 3.6% 5-sodiosulfoisophthalic acid, 50.0% neopentyl glycol and 50% ethylene glycol, based on the total of all acid and hydroxy moiety repeating units being equal to 200 mole % was purchased. The dispersion was analyzed and found to contain 35.0% polyester as described in this Example XV, 11.0% ethylene glycol butyl ether and 54.0% water. The purchased dispersion was sold under the name Toyobo MD-1200.

(B)—Ink Control Preparation

The following formula was placed in a 4-oz. jar which was then shaken for 10 minutes to effect mixing:

| 60.0 g | XV (A) |
|---|---|
| 2.0 g | Blue 15:3 Millbase, available from EASTEX Inks as G.S. Blue Millbase 31042 |
| 3.3 g | H$_2$O |

(C)—Preparation of Ink Containing Poly-5,5-dimethylhydantoin

The following formulation was mixed on a Brinkman Vibratory Mill for 15 minutes to effect solution:

| 10.00 g | of the formulation in Step (B) of Example XV |
|---|---|
| 0.625 g | poly-5,5-dimethylhydantoin (HVWT Clear Resin, Lawter International, Inc.) |

(D)—Rewettability

The products in Example XV, Step B (control) and Step C (sample), were drawn-down side-by-side on glass with a #1 RK rod. After air curing for 4 minutes, the glass was flushed for 2 minutes with running, warm tap water. The sample in XV(C) was washed clean, while the control was not substantially removed. The experiment was repeated except that the films were oven dried for 3 seconds at 100° C. under forced air. Neither the sample nor the control was affected, thus showing that poly-5,5-dimethylhydantoin at this concentration improves the rewetting without affecting the final water resistance.

EXAMPLE XVI—Example of the Invention

(A)—Polymer Preparation

The following preparation was carried out in a 3-necked, round bottomed flask equipped with variable speed stirrer (Teflon/glass), a water cooled condenser and a heating mantle controlled with a powerstat.

The vessel was purged with N$_2$ and was kept under a N$_2$ blanket throughout the reaction.

| Formula |
|---|
| 333 g Polyester Dispersion as in Example II(A) (30% solids is H$_2$O) |

-continued

| Formula |
|---|
| 196 g H₂O |
| 160 g MMA (methylmethacrylate) |
| 40 g BMA (butylmethacrylate) |
| 1 g sodium persulfate dissolved in 20 g H₂O |

The H₂O and polyester dispersion were charged to the vessel. Agitation was started, and the MMA and BMA were added. After heating to 60° C., the solution of sodium persulfate was added. The reaction was carried out at reflux (98° C.) for 3 hours and 30 minutes. An excellent dispersion was formed containing a 40% solids mixture of which 13.4% was polyester, 17.3% was MMA and 9.3% was BMA.

(B)—Preparation of Dispersion Containing the Product of Example XVI(A) and Poly-5,5-dimethylhydantoin The following mixture was shaken on the Brinkman Vibratory Mill for 15 minutes to effect solution of the poly-5,5-dimethylhydantoin.

| Formula |
|---|
| 10.0 g Example VII(A) |
| 1.2 g poly-5,5-dimethylhydantoin (HVWT 10 Clear Resin, Lawter International, Inc.) |

(C)—Film Formation and Gloss

The dispersions from Example XVI, Steps (A) and (B) were drawn down over an opacity chart (The Leneta Company, Form N2C) with a #2 RK Rod. The product of Examples XVI, Step (A), did not form a continuous film. The product of Examples XVI, Step (B), formed a high gloss, transparent film. The gloss as measured at an angle of 60° with a DR Lange Reflektometer was 28.6 for the product of Step (A) and 72.4 for the product of Step (B).

EXAMPLE XVII—Example of the Invention (A)—Polymer Preparation

An emulsion is formed from 1093 g of 33.22% dispersion of a water dispersible polyester, 1522 g of deionized water, 93 g of a 58% water solution of AMPS (Lubrizol LZ 2403A), and 1398 g of styrene stabilized with 10-15 ppm of t-butylcatechol. The polyester is prepared from 82 mole % isophthalic acid, 18 mole % 5-(sodiosulfo)isophthalic acid, 54 mole % diethylene glycol, and 46 mole % cyclohexanedimethanol. It has a Tg of 55° C. and an I.V. of 0.33 in a 60/40 phenol/tetrachloroethane mixture. A catalyst solution is prepared from 4.5 g of potassium persulfate and 281 g of water. A 5-liter round bottom reactor equipped with a bottom-scraping mechanical stirrer and temperature controller is charged with 318 g of the emulsion, 151g of distilled water, 141 g of the catalyst solution and 1.8 g of anhydrous sodium carbonate. Nitrogen is bubbled through the mixture for 15 minutes. The reactor is heated to 70° C., whereupon an exothermic reaction begins. The temperature rises to 82° C. and then begins to decrease. At this point, the remainder of the catalyst solution is pumped into the pot over a period of 3 hours, and the remaining emulsion is pumped in over 2.5 hours. After all of the emulsion is in, the reaction is cooked at 80° C. for two hours. The latex is cooled and filtered through a 110 micron polyethylene mesh to remove 7.5 g of solid material.

(B)—Preparation of the Polymer from Example XVII(A)/Poly-5.5-Dimethylhydantoin Dispersion The following formulation was made and evaluated as in Example XVI(B) and (C):

| Formula |
|---|
| 10.0 g Example XVII(A) |
| 1.0 g poly-5,5-dimethylhydantoin (HVWT 10 Clear Resin, Lawter International, Inc.) |

The product of Example XVII(A) was discontinuous and dull while the product of (B) was glossy and transparent. The gloss for Samples A and B was 14.1 and 79.7, respectively.

EXAMPLE XVIII—Example of the Invention (A)—Polymer Preparation

A pre-emulsion is formed from 1105 g of 33.2% dispersion of a water dispersible polyester, 4259 g of demineralized water, 15.2 g of Aerosol TO75 (75% solution, American Cyanamid), 2736 g of styrene stabilized with 10-15 ppm t-butylcatechol, and 1368 q 2-hydroxyethyl methacrylate stabilized with 300 ppm MEHQ. The polyester is prepared from 82 mole % isophthalic acid, 18 mole % 5-(sodiosulfo)isophthalic acid, 54 mole % diethylene glycol, and 46 mole % cyclohexanedimethanol. It has a Tg of 55° C. and an I.V. of 0.33 in a 60/40 phenol/tetrachloroethane mixture. An initiator solution is prepared from 11.4 g of ammonium persulfate, 4.5 g anhydrous sodium carbonate and 1140 g demineralized water. A 12-liter round bottom reactor equipped with a bottom-scraping mechanical stirrer and temperature controller is charged with 473 g of demineralized water, 115.1g of the initiator solution, 276 g of 33.2% water dispersible polyester and 15.2 g of Aerosol TO75 (75% solution). The vessel is purged with nitrogen for 15 minutes before starting and is held under a nitrogen blanket throughout the reaction. The reactor is heated to 75° C. At this point the initiator solution is added into the vessel over a three hour period. The pre-emulsion is added to the pot simultaneously over a 2.5 hour period. Both feeds are added subsurface. After the initiator feed has finished the emulsion is cooked an additional 2 hours at 75° C. The latex is cooled and filtered through a 110 micron polyethylene mesh to remove any deposits that may have formed.

(B)—Preparation of Polymer of Example XVIII(A) and Poly-5.5-Dimethylhydantoin Dispersion The following formulation was prepared and evaluated as in Example XVI(B)(C):

| Formula |
|---|
| 10.0 g Example XVIII(A) |
| 1.0 g poly-5,5-dimethylhydantoin (HVWT 10 Clear Resin, Lawter International, Inc.) |

The product of XVIII(A) was discontinuous and dull while the product of XVIII(B) was glossy and transparent. The gloss for Products (A) and (B) was 31.4 and 83.6, respectively.

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. A polymer blend comprising: (a) component (A) consisting essentially of, repeat units from a linear water-dissipatible polymer having carbonyloxy linking groups in the linear molecular structure wherein up to 80% of the linking groups are carbonylamido linking groups, the polymer having an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer containing substantially equimolar proportions of acid equivalents (100 mole %) to hydroxy and amino equivalents (100 mole %), the polymer comprising the reaction products of reactants selected from the following components (1), (2), (3), and (4), or the ester forming or esteramide forming derivatives thereof, as follows, wherein all stated mole percentages are based on the total of all acid, hydroxyl and amino equivalents being equal to 200 mole %:

(1) at least one difunctional dicarboxylic acid;
(2) from about 2 to about 25 mole % of at least one difunctional sulfomonomer containing at least one metallic sulfonate group or nitrogen contained non-metallic sulfonate group attached to an aromatic or cycloaliphatic nucleus wherein the functional groups are hydroxy, carboxyl or amino;
(3) at least one difunctional reactant selected from a glycol or a mixture of a glycol and diamine having two —NRH groups, the glycol containing two —C(R)$_2$—OH groups, and
(4) from none to at least one difunctional reactant selected from hydroxycarboxylic acids having one —C(R)$_2$—OH group, aminocarboxylic acids having one —NRH group, and amino-alcohols having one —C(R)$_2$—OH group and one —NRH group, or mixtures of said difunctional reactants; wherein each R in the (3) and (4) reactants is a hydrogen atom or an alkyl group of 1 to 4 carbons; and (B) component (B) comprising a hydantoinformaldehyde resin.

2. The polymer blend of claim 1 wherein said glycol containing two groups of said component (A) consists of at least 15 mole percent based on the total mole percent of hydroxy or hydroxy and amino equivalents, is a poly(ethylene glycol) having the structural formula:

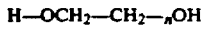

n being an integer of between about 2 to about 20.

3. The polymer blend of claim 1 wherein said glycol containing two groups of said component (A) consists of at least from about 0.1to less than about 15 mole % is a poly(ethylene glycol) having the structural formula

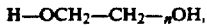

n being an integer of between 2 and about 500, and with the proviso that the mole % of said poly(ethylene glycol) within said range is inversely proportional to the quantity of n within said range;

4. The polymer blend of claim 1 wherein component (B) is present in the amount of about 0.5 to about 70 weight % based on the total weight of components (A) and (B) and wherein component (A) is an aqueous dispersion.

5. The polymer blend of claim 1 further comprising component (C) which is an acrylic polymer in an amount of about 10 to 55 percent, based on the total weight of component (A) and component (C), said acrylic polymer being compatible with the water-dissipatable polyester at a maximum acrylic polymer concentration of about 60/40 weight percent of the total acrylic/polyester polymer solids.

6. The polymer blend of claim 5 wherein said acrylic polymer is compatible with said water-dissipatible polyester at an acrylic concentration of at least 40/60 weight percent based on the weight of the blend of acrylic polymer/water-dissipatable polyester.

7. The polymer blend of claim 5 wherein said acrylic polymer is compatible with the water-dissipatable polyester at an acrylic concentration of at least 30/70 weight percent based on the weight of the blend of acrylic polymer/water-dissipatable polyester.

8. The polymer blend of claim 5 wherein component (A) comprises one or more polyesters having an inherent viscosity of from about 0.28 to about 0.38, an acid moiety of from about 75 to about 91 mole % isophthalic acid and conversely from about 25 to about 9 mole % 5-sodiosulfoisophthalic acid, and a glycol moiety of from about 25 to about 80 mole % diethylene glycol and conversely from about 75 to about 20 mole % 1,4-cyclohexanedimethanol or ethylene glycol or mixtures thereof.

9. The polymer blend of claim 8 wherein said acid moiety comprises from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

10. The polymer blend of claim 5 wherein component (C) comprises at least one acrylic polymer having a molecular weight of at least about 200,000, an acid number of less than about 70, and a Tg of greater than −20° C.

11. The polymer blend of claim 5 wherein said acrylic polymer of component (C) comprises repeating units of the formula:

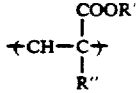

wherein R' is a straight, branched, or cyclic alkyl group of 1 to 10 carbon atoms, substituted with 0 to 2 substituents selected from the group consisting of C$_1$-C$_6$ alkoxy and halogen; and R" is H or methyl.

12. The polymer blend of claim 11 wherein R' is H, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl.

13. The polymer blend of claim 11 wherein said acrylic polymer further comprises repeating units of the formula:

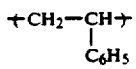

14. The polymer blend of claim 5 wherein component (C) is present in an amount effective to increase the block resistance or water resistance properties of component (A) when formulated into an ink composition.

15. The polymer blend of claim 5 wherein component (A) is present in an amount of about 45% to 90%, and component (C) is present in an amount of about 55% to 10%, these percentages being based on the total weight of components (A) and (C).

16. The polymer blend of claim 5 wherein component (A) is in the form of an aqueous composition comprising 26 to 38 weight percent of polyester material with the remainder of the aqueous composition being water or an aqueous solution, and component (C) is in the form of an aqueous emulsion or dispersion containing about 25 to 55 weight percent of acrylic polymer with the remainder being water or an aqueous dispersion; and wherein component (C) has a pH of about 7.5 to 9.0 and a Brookfield viscosity of about 200 to 1,000 CP at 25° C.

17. The polymer blend of claim 16 wherein either or both of components (A) and (C) additionally comprises up to 5 weight percent of one or more additives.

18. The polymer blend of claim 16 wherein either or both of components (A) or (C) additionally comprises about 1 to about 3 weight percent of one or more additives selected from the group consisting of an emulsion stabilizer, a surfactant, a dispersant, a biocide, and a pH stabilizer.

19. The polymer blend of claim 1 wherein the hydantoin component of said component (B) has the following structure:

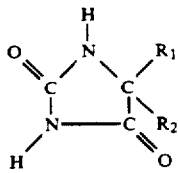

wherein $R_1$ and $R_2$ are selected from the group consisting of hydrogen or monovalent aliphatic groups and cycloaliphatic groups or $R_1$ and $R_2$ may together form a divalent aliphatic or cycloaliphatic group.

20. The polymer blend of claim 19 wherein said $R_1$ and $R_2$ are selected from the group consisting of monovalent aliphatic groups and cycloaliphatic groups.

21. The polymer blend of claim 20 wherein said hydantoin compound is a 5,5-dialkylhydantoin.

22. The polymer blend of claim 21 wherein said hydantoin compound is 5,5-dimethylhydantoin.

23. The polymer blend of claim 1 wherein said the formaldehyde useful in forming the hydantoin-formaldehyde resin is in the form of an aqueous solution of formaldehyde, paraformaldehyde or anhydrous formaldehyde gas.

24. The polymer blend of claim 1 further comprising component (E) which is about 25 to about 95 weight % of a styrene copolymer comprising:

(a) about 30 to 100 weight % of repeating units from a styrene compound.

25. The polymer blend of claim 24 wherein component (E) further comprises (a) about 30 to 100 weight % of repeating units from a styrene compound, and (b) up to 70 weight % of repeating units from a (meth)acrylate compound.

26. The polymer blend of claim 5 wherein component (A) is present in an amount of about 30 to about 99.5 weight %, component (B) is present in an amount of about 0.5 to about 70 weight %, and component (C) is present in an amount of about 1 to 55 weight %.

27. The polymer blend of claim 26 wherein component (A) is present in an amount of about 20 to about 40 weight %, component (B) is present in an amount of about 3 to about 20 weight %; and component (C) comprises about 1 to 25 weight %.

28. The polymer blend of claim 24 wherein said styrene compound is of the structure

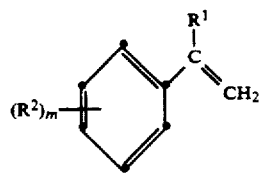

wherein $R^1$ is H or methyl, $R^2$ is a lower alkyl group of 1 to 6 carbon atoms, and m is an integer of 0 to 2; and said (meth)acrylic compound is of the structure

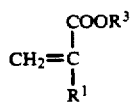

wherein $R^3$ is H or an alkyl group of 1 to 10 carbon atoms, optionally substituted with one or two substituents selected from the group consisting of hydroxy, acetoacetoxy, $C_1$-$C_6$ alkoxy, epoxy and halogen, and $R^1$ is H or methyl.

29. The polymer blend of claim 28 wherein said styrene compound is selected from the group consisting of styrene, α-methyl styrene, 4-methyl styrene, and 3-methyl styrene, t-butyl styrene and mixtures thereof.

30. The polymer blend of claim 29 wherein said styrene compound is selected from the group consisting of styrene, α-methyl styrene, 4-methyl styrene, and mixtures thereof.

31. The polymer blend of claim 25 wherein said (meth)acrylic compound is selected from the group consisting of methyl methacrylate, butyl acrylate, ethyl acrylate, propyl acrylate, 2-ethylhexyl acrylate, hydroxyethyl methacrylate, glycidyl (meth)acrylate, acetoacetoxyethyl methacrylate, and mixtures thereof.

32. The polymer blend of claim 31 wherein said (meth)acrylic compound is selected from the group consisting of butyl acrylate, ethyl acrylate, propyl acrylate, 2-ethylhexyl acrylate, methyl methacrylate, and mixtures thereof.

33. The polymer blend of claim 1 prepared by polymerizing monomers to form compound (B) in the presence of said polyester or polyesteramide.

34. An aqueous dispersion comprising water and the polymer blend of claim 1.

35. The aqueous dispersion of claim 34 wherein the polymer blend is the polymer blend of claim 30.

36. The aqueous dispersion of claim 35 comprising about 20 to about 60 weight % solids.

37. The aqueous dispersion of claim 35 comprising about 35 to about 50 weight % solids.

38. The polymer blend of claim 1 further comprises an aqueous dispersion having
   (a) from about 5 to about 40 % by weight of Component (A) and wherein said functional groups on said aromatic or cycloaliphatic nucleus are hydroxyl or carboxyl groups, and
   (b) from about 95 to about 60% by weight of a Component (D) having repeat units from
      (1) about 20 to about 80% by weight of a polymer comprising repeat units from styrene or one or more derivatives of styrene;
      (2) about 15 to about 50% by weight of hydroxyalkyl (meth)acrylate; and
      (3) about 0 to about 60% by weight of alkyl (meth)acrylate,
said aqueous dispersion containing about 95-60% by weight of said Component (D) and about 5-40% by weight of said Component (A), both said percentages being based on the combined weight of Components (A) and (D).

39. The aqueous dispersion of claim 38 wherein said hydroxyalkyl (meth)acrylate is present at 15-40% by weight of total solids present in said dispersion.

40. The aqueous dispersion of claim 39 wherein said hydroxyalkyl (meth)acrylate is present at 20-30% by weight of total solids present in said dispersion.

41. The aqueous dispersion of claim 38 having a particle size of about ≦300 nm.

42. The aqueous dispersion of claim 38 having a particle size of about 40 nm to about 200 nm.

43. The aqueous dispersion of claim 38 wherein said hydroxyalkylacrylate is hydroxypropylacrylate or hydroxyethylacrylate.

44. The aqueous dispersion of claim 38 wherein said hydroxyalkyl methacrylate is 2-hydroxyethylmethacrylate.

45. The aqueous dispersion of claim 38 having a solids content of about 25 to about 45 weight % based on total weight of said dispersion.

46. The aqueous dispersion of claim 38 wherein component (A) has a solids content of from about 5 to about 40 weight % based on dry solids.

47. The aqueous dispersion of claim 46 wherein Component (A) has a solids content of from about 10 to about 34 weight % based on dry solids.

48. The aqueous dispersion of claim 38 wherein said sulfomonomer is sodiosulfoisophthalic acid.

49. The aqueous dispersion of claim 38 wherein said dicarboxylic acid comprises isophthalic acid.

50. The aqueous dispersion of claim 38 wherein said glycol comprises a poly(ethylene glycol).

51. An aqueous dispersion of claim 38 wherein said polyester has repeat units from isophthalic acid, sodiosulfoisophthalic acid, diethylene glycol, and another glycol selected from at least one of ethylene glycol and 1,4-cyclohexandimethanol, and another polymer containing at least 20% by weight of repeat units from styrene or one or more derivatives of styrene, and at least 15% by weight of hydroxyalkyl (meth)acrylate.

52. The aqueous dispersion of claim 38 wherein said component (D) comprises repeating units from 0 to about 80 weight % of one or more comonomers selected from the group consisting of ethylene, acrylic acid, methacrylic acid, acrylic and methacrylic acid esters, acrylamides, unsaturated dicarboxylic acid diesters, vinyl chloride and maleic anhydride.

53. The aqueous dispersion of claim 38 wherein said component (D) comprises repeating units from at least 20% by weight of one or more comonomers selected from styrene, methylmethacrylate, ethylhexylacrylate and butylacrylate.

54. An ink composition comprising about 3 to about 40 weight % of
   (I) a polymer blend comprising:
      (a) about 3.0 to about 40% by weight of component (A) consisting essentially of repeat units from a linear water-dissipatible polymer having carbonyloxy linking groups in the linear molecular structure wherein up to 80% of the linking groups are carbonylamido linking groups, the polymer having an inherent viscosity of from about 0.1 to about 10 measured in a 60/40 parts by weight solution of phenol/tetrachloroethane at 25° C. and at a concentration of 0.25 gram of polymer in 100 mL of the solvent, the polymer containing substantially equimolar proportions of acid equivalents (100 mole %) to hydroxy and amino equivalents (100 mole %), the polymer comprising the reaction products of reactants selected from the following components (1), (2), (3), and (4), or the ester forming or esteramide forming derivatives thereof, as follows, wherein all stated mole percentages are based on the total of all acid, hydroxyl and amino equivalents being equal to 200 mole %:
         (1) at least one difunctional dicarboxylic acid;
         (2) from about 2 to about 25 mole % of at least one difunctional sulfomonomer containing at least one metallic sulfonate group or nitrogen-contained non-metallic sulfonate group attached to an aromatic or cycloaliphatic nucleus wherein the functional groups are hydroxy, carboxyl or amino;
         (3) at least one difunctional reactant selected from a glycol or a mixture of a glycol and diamine having two —NRH groups, the glycol containing two —C(R)₂—OH groups, and
         (4) from none to at least one difunctional reactant selected from hydroxycarboxylic acids having one —C(R)₂OH group, aminocarboxylic acids having one —NRH group, and amino-alcohols having one —C(R)₂—OH group and one —NRH group, or mixtures of said difunctional reactants; wherein each R in the (3) and (4) reactants is a hydrogen atom or an alkyl group of 1 to 4 carbons; and
      (b) about 0.5 to about 70% by weight of component (B) comprising a hydantoinformaldehyde resin in the amount of about 0.5 to about 70 weight % based on the total weight of components (A) and (B) and wherein component (A) is an aqueous polyester dispersion,
   (II) up to about 45 weight % of a pigment material or solvent dye,
   (III) about 40 to about 90 weight % of water, and
   (IV) 0 to about 15 weight % of an alcohol.

55. The ink composition of claim 54 wherein said pigment material of component (II) is one or a mixture of the following color index materials: C. I. Pigment Yellow 17, C. I. Pigment Blue 27, C. I. Pigment Red 49:2, C. I. Pigment Red 81:1, C. I. Pigment Red 81:3, C. I. Pigment Red 81:x, C. I. Pigment Yellow 83, C. I.

Pigment Red 57:1, C. I. Pigment Red 49:1, C. I. Pigment Violet 23, C. I. Pigment Green 7, C. I. Pigment Blue 61, C. I. Pigment Red 48:1, C. I. Pigment Red 52:1, C. I. Pigment Violet 1, C. I. Pigment White 6, C. I. Pigment Blue 15, C. I. Pigment Yellow 12, C. I. Pigment Blue 56, Pigment Yellow 14, C. I. Pigment Red 48:2, C. I. Pigment Blue 15:3, C. I. Pigment Yellow 1, C. I. Pigment Yellow 3, C. I. Pigment Yellow 13, C. I. Pigment Orange 16, C. I. Pigment Yellow 55, C. I. Pigment Red 41, C. I. Pigment Orange 34, C. I. Pigment Blue 62, C. I. Pigment Red 22, C. I. Pigment Red 170, C. I. Pigment Red 88, C. I. Pigment Yellow 151, C. I. Pigment Red 184, C. I. Pigment Blue 1:2, C. I. Pigment Red 3, C. I. Pigment Blue 15:1, C. I. Pigment Red 23, C. I. Pigment Red 112, C. I. Pigment Yellow 126, C. I. Pigment Red 169, C. I. Pigment Orange 13, C. I. Pigment Red 1-10, 12, C. I. Pigment Blue 1:X, C. I. Pigment Yellow 42, C. I. Pigment Red 101, C. I. Pigment Brown 6, C. I. Pigment Brown 7, C. I. Pigment Brown 7:X, C. I. Pigment Black 11, C. I. Pigment Metal 1, or C. I. Pigment Metal 2.

56. The ink composition of claim 54 wherein said solvent dye is one or a mixture of the following: C. I. Solvent Yellow 135, C. I. Basic Red 1, C. I. Basic Violet 11, C. I. Solvent Blue 44, C. I. Solvent Blue 38, C. I. Solvent Black 45, C. I. Solvent Orange 41, C. I. Solvent Red 124, C. I. Solvent Red 127, C. I. Solvent Yellow 48, C. I. Solvent Blue 45, C. I. Solvent Yellow 83:1, or C. I. Basic Yellow 40 and 42.

57. The ink composition of claim 54 additionally comprising up to 10 weight % of at least one additional additive selected from the group consisting of a wax, a biocide, a surfactant, a transfer agent, a coalescence aid, and an antifoam.

* * * * *

UNITED STATES PATENT AND TRADEMARK OFFICE
CERTIFICATE OF CORRECTION

PATENT NO. : 5,274,025

DATED : December 28, 1993

INVENTOR(S) : Stockl et al.

It is certified that error appears in the above-indentified patent and that said Letters Patent is hereby corrected as shown below:

Column 29, line 28 (Claim 1), there should be a " — " between "nitrogen" and "con—".

Column 29, line 46, (Claim 1), there should be a " — " hyphenating the word "hydantoinformaldehyde" between the "n" and the "f".

Column 29, line 53, (Claim 2), the parentheses have been omitted in the formula. The formula should be as follows:

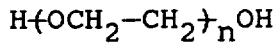

Column 29, line 61, (Claim 3), the parentheses have been omitted in the formula. The formula should be as follows:

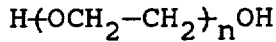

Column 33, line 32, (Claim 41), there should be a single line instead of a double line under the "less than" symbol. It should be "$\leq$".

Column 34, line 18, (Claim 54), "0.1 to about 10" should read     — — — 0.1 to about 1.0 — — —.

Column 34, line 20, (Claim 54), the " . " after "C" should be removed.

UNITED STATES PATENT AND TRADEMARK OFFICE
CERTIFICATE OF CORRECTION

PATENT NO. : 5,274,025

DATED : December 28, 1993

INVENTOR(S) : Stockl et al.

It is certified that error appears in the above-identified patent and that said Letters Patent is hereby corrected as shown below:

Column 35, line 6, (Claim 55), after "ment Blue 56," the following should be inserted  --- C.I. Pigment Orange 5, C.I. Pigment Black 7,---.

Signed and Sealed this

Seventeenth Day of May, 1994

*Attest:*

BRUCE LEHMAN

*Attesting Officer*     *Commissioner of Patents and Trademarks*